No. 672,563. Patented Apr. 23, 1901.
P. MARINO.
ACCUMULATOR BATTERY.
(Application filed Apr. 10, 1900.)
(No Model.)

WITNESSES:
Ella L. Giles
Clara D. Frohbach

INVENTOR
Pascal Marino
BY
Richardson
ATTORNEYS

UNITED STATES PATENT OFFICE.

PASCAL MARINO, OF BRUSSELS, BELGIUM.

ACCUMULATOR-BATTERY.

SPECIFICATION forming part of Letters Patent No. 672,563, dated April 23, 1901.

Application filed April 10, 1900. Serial No. 12,373. (No model.)

*To all whom it may concern:*

Be it known that I, PASCAL MARINO, chemist, a subject of the King of Belgium, and a resident of 77 Rue des Toulons, Brussels, Belgium, have invented certain new and useful Improvements in Accumulator-Batteries, of which the following is a specification.

This invention relates to the composition of the plates of an accumulator-battery, to their arrangement and separation, and to means of aiding circulation of the electrolyte and escape of the gases evolved, as I shall describe, referring to the accompanying drawings.

Figure 1:
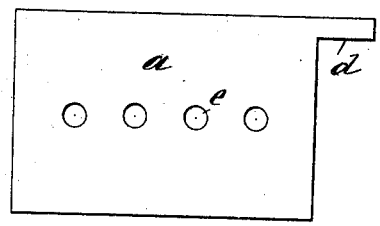
Figure 3:
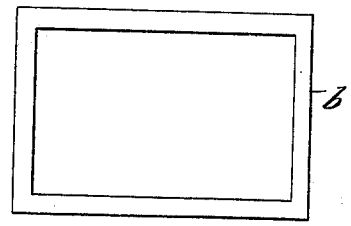
Figure 2:
Figure 4:
Figure 5:
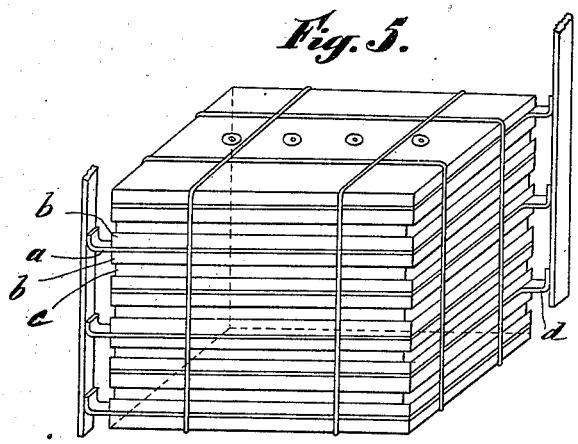
Figure 9:
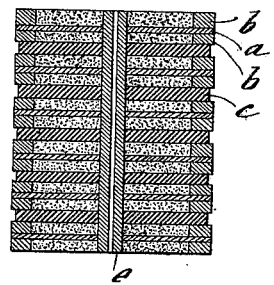
Figures 6, 7, 8:
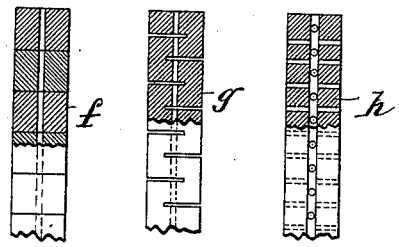

Figure 1 is a plan, and Fig. 2 is a section, of one of the plates. Fig. 3 is a plan of one of the frames. Fig. 4 is a section of the plate with its frames and layer of active material. Fig. 5 is perspective view of the battery, consisting of superposed plates and separators; and Figs. 6, 7, and 8 show, on an enlarged scale, several forms of perforated or slotted tubes for aiding circulation of the electrolyte and escape of gas.

I. The negative plates consist of a thin plate $a$, of lead, having on each side a layer of active material consisting of lead oxid, preferably formed—that is to say, reduced—to binoxid. On each side is a frame $b$, of ebonite or other suitable insulating material, confining the active material, so as to prevent it from dropping and producing short-circuiting.

The positive plates are of the same kind as the negative, except that instead of the lead plate aluminium may be employed or other metal not attacked by the electrolyte and that instead of lead binoxid spongy lead constitutes the active material.

II. The negative plates are separated from the positive by porous partitions $c$, which allow migration of the ions and withstand the action of acid electrolyte. This partition is a slice or flat piece of peat, which is first washed with water and then thoroughly dried, after which it is purified and freed from foreign matters in a bath strongly acidulated with sulfuric acid and then treated with alcohol of ninety per cent. or benzin. Although peat is preferred, xyloid lignite may be used, treated like the peat, or a wooden board carbonized on the surface by immersing it for some hours in concentrated sulfuric acid or by the action of fire. The sulfuric acid not only purifies the peat and lignite and carbonizes the wood, but it also confers new properties on the fibers of those bodies, especially porosity, eliminating also the volatile materials contained in the wood. In this condition the partition is non-conductive, it absorbs the gases in its pores, and allows passage of the migrating ions.

III. The plates are horizontally superposed, alternating those of the same sign connected by lugs $d$, projecting from the metal plates soldered to conducting-bars. All the superposed plates and partitions are bound together by ties of caoutchouc or other material not attacked by acids.

IV. All the plates and partitions have through them several coincident holes in which are placed short pieces of tube $f$, each the depth of a plate, or tubes of greater length perforated with holes, as $h$, or with saw-cuts, as $g$. These tubes may be made of wood, charcoal, or caoutchouc or other non-conducting material. The chief object of these tubes is to form what may be termed "chimneys" for escape of gases, at the same time being perforated or having openings to allow the electrolyte to penetrate into the heart of the battery and circulate throughout the active material, producing the required chemical effects.

The application in electric accumulators of channels which at first sight are almost like the heretofore-described chimneys has already been proposed. In fact, there is an absolute and characteristic difference between the known arrangements and the construction of the chimneys of the present accumulator. All the arrangements hitherto proposed are in reality channels merely constituted by perforations through the active material, which are liable to be filled by the active material at the lightest jar, and consequently to produce short circuits in the accumulators. The channels were, further, intended only to increase the useful surface of the plates. By means of the heretofore-described chimneys there is no short circuit possible, because the active material cannot be broken off, since the chimneys are formed with an insulating and non-conducting material, which does not allow the disengagement or the fall of the active material into the said chimneys, while allowing, in consequence of their special mechanical arrangement, the realization of the principal proposed view—that is, the escape of the gases produced in the interior of the element.

Although I have described special details of the accumulator, it is to be understood that the combination of these details is also to be claimed as constituting a complete whole. But for the horizontality of the plates the chimneys could not be employed, and without the chimneys the battery could not have its proper action, because but for them there would be imperfect circulation of the electrolyte and no easy escape for the gases, features absolutely essential in an accumulator-battery. Moreover, the employment of frames to prevent escape of the active material can only be practical when the plates are horizontal, and the porous partitions which separate the plates are essential to the horizontal arrangement. Thus if one or other of the constituent parts were absent much of its utility would be lost.

Having now described my invention, what I claim as new, and desire to secure by Letters Patent, is—

1. In an electrical accumulator, in which the positive electrode consists of a lead plate and the negative one is made of a metallic plate which the electrolyte cannot attack, the combination with said electrodes of a frame of non-conducting material at each side of each of said plates, said frames being each filled with formed active mass, said plates being arranged horizontally, porous partitions made with pure-peat tissue and wooden boards saturated with cold concentrated sulfuric acid, said plates and partitions being perforated and cylinders of non-conducting material provided with small central channels extending into said perforations so as to facilitate the free circulation of the electrolyte and to allow the escape of gas.

2. In combination in an electric accumulator the positive and negative plates having openings and cylinders of wood, charcoal extending through the said openings, substantially as described.

In witness whereof I have hereunto set my hand in presence of two witnesses.

PASCAL MARINO.

Witnesses:
ALBERT FRAIPONS,
GREGORY PHELAN.